Sept. 18, 1923.
A. S. WELLS ET AL
DENTAL MOLDING APPARATUS
Filed July 18, 1921
1,468,428
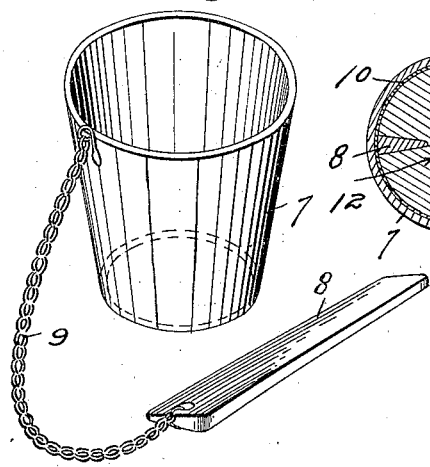
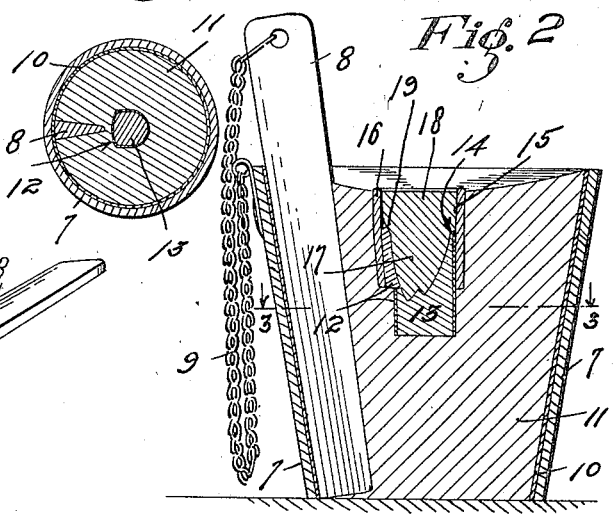
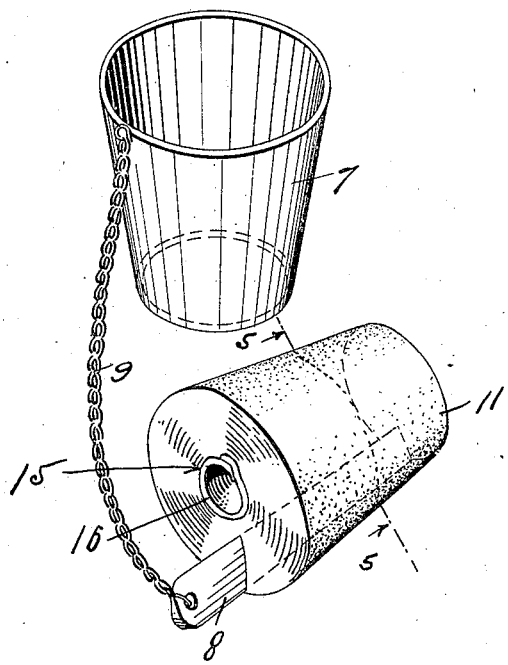
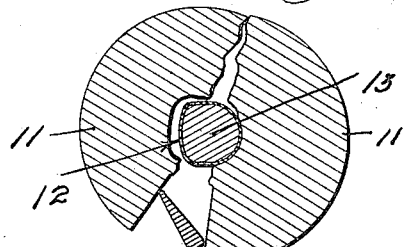
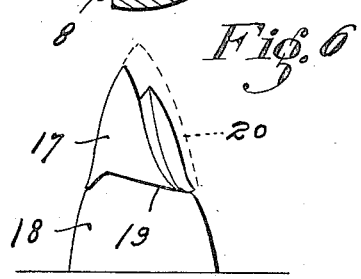
Inventor
AMOS S. WELLS AND
LEE A. HARKER
By his Attorneys
Merchant Kilgor & Kilgor Patented Sept. 18, 1923.

1,468,428

UNITED STATES PATENT OFFICE.

AMOS S. WELLS AND LEE A. HARKER, OF MINNEAPOLIS, MINNESOTA.

DENTAL MOLDING APPARATUS.

Application filed July 18, 1921. Serial No. 485,588.

*To all whom it may concern:*

Be it known that we, AMOS S. WELLS and LEE A. HARKER, citizens of the United States, residing at Minneapolis, in the county of Hennepin and State of Minnesota, have invented certain new and useful Improvements in Dental Molding Apparatus; and we do hereby declare the following to be a full, clear, and exact description of the invention such as will enable others skilled in the art to which it appertains to make and use the same.

Our invention relates broadly to dentistry and, more particularly, to the making of models of teeth to which are to be applied full crowns, three-quarter crowns, inlays and the like, and which models are made from plastic impressions or matrices taken from teeth after they have been treated and prepared to receive such parts. The purpose of these models is to afford means on which all preliminary work may be done, as to making full crowns, three-quarter crowns, inlays and the like, without the presence of the patient, so that a complete and perfectly fitting part may be made and thereafter applied to a prepared tooth and anchored or secured thereto in the customary or any suitable manner.

It is now customary, in making such models, to prepare or fold a paper flask to receive a body of plastic molding material, such as a plaster of Paris, into which an impression or matrix-containing casing may be pressed. To afford suitable means for holding a model while working thereon, it is desirable to form therewith a base, which is accomplished, at the time of molding the model, by pressing the impression or matrix-containing casing into the molding material, while in plastic condition, considerably above the gum line, so that, when the molding material is hard and the model-molding metal is poured therein, said metal will overflow the impression and fill or partly fill the cavity, formed in the molding material by pressing said casing therein, and thereby form said base and a definite gum line at the junction of the base with the model. After the metal from which the model and its base are formed is hard, the model is released from the body of molding material by cutting and breaking the same away, which is slow and tedious work and during this process the model is very liable to be damaged.

Our invention has for its object to provide a suitable permanent flask for releasably holding a plastic body of molding material, such as plaster of Paris, and partly embedding in the molding material a suitable device, such as a blade, by which the molding material may be cracked or split, when removed from the flask, to instantly release the parts held in the molding material, thus saving considerable time and eliminating all danger of damaging the model.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the invention;

Fig. 2 is a view principally in central vertical section, illustrating a completed model held in its matrix, which, in turn, is held in a casing embedded in a body of molding material in the improved flask, with the cracking or splitting blade partly embedded in the molding material;

Fig. 3 is a horizontal section taken on the line 3—3 of Fig. 2, on a reduced scale;

Fig. 4 is a perspective view with the parts assembled as shown in Fig. 2, with the exception that the body of molding material has been removed from the flask;

Fig. 5 is a transverse section taken on the line 5—5 of Fig. 4 and showing the body-molding material cracked or split by means of the blade to release the parts held therein; and Fig. 6 is an elevation of the model removed from its matrix and having applied thereto a three-quarter crown, illustrated by means of broken lines.

The invention comprises a flask 7 and a cracking or splitting blade 8 attached to said flask by a flexible connection in the form of a chain 9. The flask 7 is open at both ends, is upwardly tapered and is made of metal or other relatively rigid material that will keep its shape and may be used over and over again.

In molding a model of a tooth to be treated, the internal wall of the flask 7 is preferably first coated with a non-adhesive material 10, such as vaseline, and then placed on a table or other support to close the open lower end thereof. Said flask 7 is then filled with a plastic molding material 11, preferably plaster of Paris. The blade 8 is next inserted into the flask 7 in an upright position and partly embedded in the molding material 11, while the same is still in plastic condition, with its back leaning against the internal wall of the flask 7 and radially disposed in respect to said flask and the blade edge directed toward the model 17, as best shown in Figs. 2 and 3. The blade 8 is of such length as to be only partly embedded in the molding material 11 when pressed completely therethrough, thus leaving a portion of the blade 8 exposed, by which it may be moved or turned, as will presently appear.

A two-part casing 12, containing an impression or matrix 13 taken from a tooth to be treated, is next pressed into the molding material 11, while still in plastic condition, and at substantially the axis of the flask 7. The upper edge of the casing 12 and impression or matrix 13 is formed to indicate, as at 14, the line between the tooth and gum, and it is important to note that the casing 12 is pressed into the molding material 11 to a depth which leaves a cavity 15 in the molding material 11 above said line 14. As shown, a guard 16 is folded around the upper portion of the casing 12 before the same is pressed into the molding material 11 and extends to the top of the cavity 15, as best shown in Fig. 2. The purpose of this guard 16 is to prevent the molding material 11, while still in plastic condition, from flowing over the gum or upper edge 14 of the casing 12 and impression or matrix 13 and thereby eliminating the said edge from the model when the same is cast. However, this guard 16 is not absolutely necessary, provided the molding material is of the proper constituency, at the time the same is placed in the flask, to prevent flowing. Metal is then poured into the impression or matrix 13 to form the model 17 and the cavity 15 is also filled with the metal to form a base 18 on the model by which it may be held. At the time of casting the model and its base, a definite shoulder 19 or edge is formed, at the junction therebetween, to indicate the line of the gum and to which the operator may work in making the required tooth part.

After the metal from which the model and its base are formed is cold, the molding material is removed from the flask 7 and the parts embedded therein by pressing on said molding material through the open bottom of the flask 7 and forcing the same through the open top thereof, as shown in Fig. 4. Owing to the tapered internal wall of the flask 7 and the coating of non-adhesive material 10 thereon, the removal of said molding material from the flask 7 is extremely easy as it will not stick or bind. The blade 8 is then moved by twisting or turning the same to crack or split the molding material 11, as shown in Fig. 5, and thereby release the casing 12 and guard 16. Since the blade edge is directed towards the model 17 it is obvious that the twist of the blade will tend to split the material 11 into two equal sections, as shown in Fig. 5, whereby the casing 12 is immediately freed of the material 11. The model 17 then may be removed from the guard 16 and its matrix 13 without danger of damaging the same. The completed model is shown in Fig. 6, to which is applied a three-quarter crown 20, as indicated by broken lines. The flexible connection 9 prevents the blade 8 from being lost, and also keeps said blade where the same may be easily reached.

The above described invention has, in actual usage, proven highly efficient for the purpose had in view.

What we claim is:—

1. A device of the character described comprising, in combination with a flask adapted to receive a plastic material containing an embedded model, a blade adapted to be longitudinally embedded at one side of the material and having an embedded edge directed towards the model, and provided with means for twisting said blade, after the material has hardened, whereby to crack the material and free the model, substantially as described.

2. A device of the character described comprising, in combination with a dental flask adapted to receive a plastic material containing an embedded model, a wedge-shaped blade embedded in said material, lying in a lateral plane which passes through the model and having its sharp edge directed towards the latter, and means for twisting said blade, whereby to crack the material and free the model, substantially as described.

In testimony whereof we affix our signatures.

AMOS S. WELLS.
LEE A. HARKER.